United States Patent [19]

Saito et al.

[11] Patent Number: 4,820,581

[45] Date of Patent: Apr. 11, 1989

[54] MAGNETIC RECORDING MEDIUM

[75] Inventors: Shinji Saito; Hiroshi Ogawa; Akihiro Matsufuji; Yasuo Tamai, all of Odawara, Japan

[73] Assignee: Fuji Photo Film Co., Ltd., Japan

[21] Appl. No.: 798,760

[22] Filed: Nov. 15, 1985

[30] Foreign Application Priority Data

Nov. 16, 1984 [JP] Japan .................................. 59-240459
Nov. 16, 1984 [JP] Japan .................................. 59-240460

[51] Int. Cl.$^4$ ........................................................ G11B 5/70
[52] U.S. Cl. ........................................ 428/323; 427/128; 428/329; 428/412; 428/423.1; 428/480; 428/694; 428/900
[58] Field of Search ................. 428/323, 423.1, 412, 428/480, 694, 900, 329; 427/128

[56] References Cited

U.S. PATENT DOCUMENTS

| | | |
|---|---|---|
| 4,503,120 | 3/1985 | Yamaguchi et al. ................ 428/694 |
| 4,505,966 | 3/1985 | Adachi et al. ...................... 428/694 |
| 4,562,117 | 12/1985 | Kikukawa et al. .................. 428/694 |
| 4,568,599 | 2/1986 | Ono et al. ............................ 428/694 |
| 4,568,612 | 2/1986 | Lehner ................................. 428/694 |
| 4,571,362 | 2/1986 | Sato et al. ........................... 428/694 |
| 4,591,528 | 5/1986 | Nishimatsu et al. ............... 428/694 |

*Primary Examiner*—Paul J. Thibodeau
*Attorney, Agent, or Firm*—Ostrolenk, Faber, Gerb & Soffen

[57] ABSTRACT

A magnetic recording medium comprising a nonmagnetic support and a magnetic recording layer provided on said support, in which said magnetic recording layer comprises:

a ferromagnetic metal powder having a specific surface area of not less than 40 m$^2$/g and an abrasive having a Mohs' scale of hardness of not less than 6, both being dispersed in a binder containing a polycarbonate-polyurethane.

12 Claims, No Drawings

MAGNETIC RECORDING MEDIUM

BACKGROUND OF THE INVENTION

1. Field of the invention

The present invention relates to a magnetic recording medium. More particularly, the invention relates to an improvement of a magnetic recording medium comprising a nonmagnetic support and a magnetic recording layer.

2. Description of prior arts

A magnetic recording medium such as an audio-tape, a video-tape, or a recording medium employed in a computer system, basically comprises a nonmagnetic support and a magnetic recording layer provided on the support. The magnetic recording layer comprises a ferromagnetic powder such as a needle crystalline powder of $\gamma$—$Fe_2O_3$, Co-containing ferromagnetic iron oxide, or $CrO_2$ dispersed in a binder. Recently, demand for a higher density recording system has increased, and hence studies of a magnetic recording medium using a ferromagnetic metal powder in place of the conventional oxide-type ferromagnetic powder have been made.

The ferromagnetic metal powder has been employed as a ferromagnetic powder of a recording medium of a computer system. The ferromagnetic metal powder is high in coercive force (Hc) and residual flux density (Br) and moreover is stable in a wide temperature range. For these reasons, attention to the ferromagnetic metal powder has been also paid for the use in such magnetic recording media as a video-tape or an audio-tape. The ferromagnetic metal powder is known to afford recording of a higher density, as the powder is more minimized.

While the ferromagnetic metal powder has excellent characteristics, there is a drawback that the ferromagnetic metal powder is low in hardness. In more detail, a magnetic recording layer using the ferromagnetic metal powder shows poor running property, that is, the recording layer is easily scratched or the metal powder is easily dropped off from the layer in the course of running in contact with a magnetic head. These troubles cause the so-called drop-outs. Further, the dropped metal powder is apt to adhere to the surface of the magnetic head to cause clogging on the head. Furthermore, if a magnetic layer has a poor running property, the magnetic layer shows only short still life in the still mode in which a still video image is continuously reproduced.

It is known that the running property of a magnetic recording layer is improved by incorporating an abrasive (i.e., hard particles) such as corundum, silicon carbide or chromium oxide in the recording layer. However, generally the effect of incorporation of an abrasive is shown only where the abrasive is incorporated in a large amount. However, a magnetic recording layer containing a large amount of an abrasive likely causes extreme abrasion of a magnetic head employed in contact with the recording layer. Further, a large amount of an abrasive is unfavorable to the electromagnetic conversion characteristics of the recording medium. Furthermore, the incorporated abrasive is apt to be easily dropped off to adhere to the surface of the magnetic head.

For the above-described reasons, the conventional measure for improving the running property of the magnetic recording layer is not thought to be satisfactory, in view of the resulting characteristics of the magnetic recording medium as well as unfavorable effect given to a magnetic head.

SUMMARY OF THE INVENTION

It is an object of the present invention to provide a new magnetic recording medium.

It is another object of the invention to provide a magnetic recording medium which is improved particularly with respect to the electromagnetic conversion characteristics.

It is a further object of the invention to provide a magnetic recording medium which is improved particularly with respect to the electromagnetic conversion characteristics as well as the running property.

There is provided by the present invention a magnetic recording medium comprising a nonmagnetic support and a magnetic recording layer provided on said support, in which said magnetic recording layer comprises:

a ferromagnetic metal powder having a specific surface area of not less than 40 $m^2/g$ and an abrasive having a Mohs' scale of hardness of not less than 6, both being dispersed in a binder containing a polycarbonate-polyurethane.

The magnetic recording medium of the invention shows improved electromagnetic conversion characteristics as well as an improved running property.

Moreover, a magnetic paint (i.e., magnetic powder dispersion) employed for the preparation of the magnetic recording layer of the recording medium of the present invention can be stably stored, because it hardly shows unfavorable behavior such as agglomeration of magnetic particles. Thus, the procedure for the preparation of the magnetic recording medium is rendered easy. Further, it is advantageous that the surface of the resulting magnetic recording layer shows high smoothness.

DETAILED DESCRIPTION OF THE INVENTION

A magnetic recording medium of the invention comprises a nonmagnetic support and a magnetic recording layer provided on the support. The magnetic recording layer comprises a ferromagnetic metal powder dispersed in a binder.

There is no specific limitation on the nonmagnetic support employable in the present invention.

A material of the nonmagnetic support is not particularly limited and can be selected, for example, from polyethylene terephthalate, polypropylene, polycarbonate, polyethylene naphthalate, polyamide, polyamideimide, polyimide and metallic foils such as aluminum foil and stainless steel foil. The thickness of the support film generally is in the range of 3 to 50 $\mu m$ and preferably in the range of 5 to 30 $\mu m$.

There is no specific limitation on smoothness of the surface of the nonmagnetic support. However, it can be generally said that the smoother the surface of the nonmagnetic support is, the smoother the surface of a magnetic recording layer formed on the surface of the support. If the surface of the magnetic recording layer is made smoother, the electromagnetic conversion characteristics of the recording medium is rendered higher. On the contrary, if the surface of the magnetic recording layer is made smoother, friction between the recording layer and the magnetic head increases and accordingly the surface of the recording layer is apt to receive scratching thereon.

In the conventional magnetic recording medium using a ferromagetic metal powder, the recording layer does not have enough hardness to keep the surface thereof from scratching. For this reason, a non-magnetic support of high smoothness cannot be employed in the conventional magnetic recording medium using a ferromagnetic metal powder.

In contrast, the magnetic recording layer of the recording medium of the invention has an increased hardness so that it is more resistant to scratching thereon. Therefore, a nonmagnetic support having a smoother surface can be employed in the magnetic recording medium of the present invention. In the magnetic recording medium of the invention, it is preferred that the nonmagnetic support has a center line average height of lower than 0.1 $\mu$m at a cut-off value of 0.25 mm. More preferably, the center line average height of the nonmagnetic support of the invention is lower than 0.02 $\mu$m at the same cut-off value.

The nonmagnetic support may have a back layer (or backing layer) on the opposite side of the side where a magnetic recording layer is to be coated.

The magnetic recording medium of the invention has the above-described nonmagnetic support coated thereupon with a magnetic recording layer comprising a particulate ferromagnetic metal powder dispersed in a specific binder composition.

More specifically, the magnetic recording medium of the invention uses a ferromagnetic metal powder containing Fe, Co or Ni and having a specific surface area of not less than 40 m2/g.

As a typical ferromagnetic metal powder, there can be mentioned a ferromagnetic alloy powder containing a metal component of at least 75 wt. % in which at least 80 wt. % of the metal component comprises at least one ferromagnetic metal or metal alloy (e.g., Fe, Co, Ni, Fe—Co, Fe—Ni, Co—Ni, Fe—Zn—Ni or Co—Ni—Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide. These ferromagnetic metal powders are already known, and can be prepared by known methods.

For instance, a ferromagnetic alloy powder can be prepared by the following known processes.

(a) a process of reducing a double organic acid salt (typically, an oxalate) by a reducing gas such as hydrogen;

(b) a process of reducing a ferric oxide and/or other metal oxide by a reducing gas such as hydrogen to obtain Fe particle, Fe—Co particle, etc.;

(c) a process of thermally decomposing a metal carbonyl compound;

(d) a process of reducing a ferromagnetic metal in an aqueous solution in the presence of a reducing agent such as sodium borohydride, hypophosphite or hydrazine;

(e) a process of electrolyzing a ferromagnetic metal solution at mercury electrode and separating the deposited ferromagnetic metal powder from mercury; and (f) a process of evaporating a metal in an inert atmosphere under reduced pressure to obtain a fine powder.

The ferromagnetic powder normally used is in a needle shape, grain shape, dice shape, rice shape or plate shape. The size of ferromagnetic powder is normally not greater than 1 $\mu$m, and preferably not greater than 0.5 $\mu$m. In the case of using a ferromagnetic metal powder, its specific surface area preferably is not less than 40 m2/g, and more preferably not less than 45 m2/g.

The binder employable in the formation of the magnetic recording layer of the invention should contain a polycarbonate-polyurethane.

The polycarbonate-polyurethane can be prepared generally by a reaction between a polycarbonate-polyol and polyisocyanate or a reaction between a polycarbonate-polyester (which is prepared from a polycarbonate-polyol and a dicarboxylic acid) and a polyisocyanate. The above-mentioned polycarbonate-polyol can be prepared generally by transesterification between a polyhydric alcohol and a dialkylcarbonate or diallylcarbonate or condensation between a polyhydric alcohol and phosgene.

There is no specific limitation on the polycarbonate-polyurethane employed in the present invention. Accordingly, known polycarbonate-polyurethanes can be employed. Examples of the polycarbonate-polyurethane are described in Japanese Patent Provisional Publication No. 58(1983)-60430.

There are no specific limitations on the polyol, dialkylcarbonate, diallylcarbonate and polyisocyanate employable in the preparation of a polycarbonate-polyol. Thus, known compounds can be employed.

Examples of the polyol include 1,6-hexanediol, 1,4-butanediol, 1,3-butanediol, neopentyldiol, and 1,3-pentanediol. 1,6-Hexanediol is preferred. Also employable is an aromatic polyhydric alcohol. The aromatic polyhydric alcohol includes a compound in which hydroxyl groups are attached directly or via a short hydrocarbon chain to an aromatic ring.

Examples of the aromatic polyhydric alcohol include the compounds having the following formulae (in which (Bz) means a benzene ring and (Np) means a naphthalene ring).

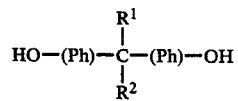

In the above formula, $R^1$ is hydrogen atom or an alkyl group having 1–3 carbon atoms, and $R^2$ is hydrogen atom, an alkyl group having 1–7 carbon atoms, or an aryl group.

In the above formula, n is an integer of 1 to 10.

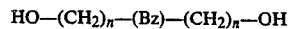

In the above formula, n is 1 or 2.

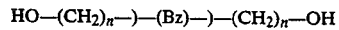

In the above formula, n is 1 or 2.

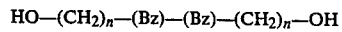

In the above formula, n is 1 or 2.

HO—(CH₂)ₙ—)—(Np)—)—(CH₂)ₙ—OH

In the above formula, n is 1 or 2.

R—)—(Bz)—X—(Bz)—OR—OH

In the above formula, R is —(CH₂)₂— or —CH(CH₃)—(CH₂)₂—, and X is —SO₂—, —CO—, —C(CH₃)₂—, or —(CH₃)₂—(Bz)—C(CH₃)₂—.

OH—(Bz)—OH

In the above formulae, the hydroxyl groups can be located in any position, but they preferably take parapositions. A specifically preferred aromatic polyhydric alcohol is bisphenol A.

Examples of the polyisocyanate include an adduct of 3 moles of diisocyanate (e.g., tolylene diisocyanate or xylylene diisocyanate) and 1 mole of trimethylol propane, a buret adduct of 3 moles of hexamethylene diisocyanate, an isocyanurate adduct of 5 moles of tolylene diisocyanate, an adduct of 3 moles of tolylene diisoyanate and 2 moles of hexamethylene diisocyanate, and a polymeric compound of diphenylmethane diisocyanate.

The polycarbonate-polyurethane employable in the invention generally has a molecular weight (weight average molecular weight) of 5,000 to 200,000. A polycarbonatepolyurethane having an extremely low molecular weight is disadvantageous in the improvement of the running property, while a polycarbonate-polyurethane having an extremely high molecular weight is disadvantageous in that a homogeneous dispersion is difficult to prepare.

The amount of the binder is generally in the range of 10 to 100 parts by weight and preferably in the range of 20 to 40 parts by weight per 100 parts by weight of the ferromagnetic metal powder.

According to the present invention, the binder preferably contains a polycarbonate-polyurethane in an amount of not less than 10 % by weight based on the total amount of the binder. More preferably the amount of the polycarbonate-polyurethane is in an amount of not less than 30 % by weight. The other portion of the binder can be occupied by one or more other binder materials.

Examples of the other binder material employable in combination with the polycarbonate-polyurethane include cellulose derivatives (e.g., nitrocellulose and cellulose acetate), vinyl chloride/vinyl acetate copolymer resins, (e.g., vinyl chloride/vinyl acetate copolymers, vinyl chroride/vinyl acetate/vinylalcohol copolymers, and vinyl chloride/vinyl acetate/mateic acid anhydride copolymers), vinylidene chloride resins (e.g., vinylidene chloride/vinyl chloride copolymers and vinylidene chloride/acrylonitrile copolymers), polyester resins (e.g., alkyd resin and linear polyester), acrylic resins (e.g., acrylic acid/acrylonitrile copolymer and methyl acrylate/acrylonitrile copolymer), polyvinyl acetal resin, polyvinyl resin, phenoxy resin, epoxy resin, butadiene/acrylonitrile copolymer resin, polyurethane resin and urethane epoxy resin. Preferred are vinyl chloride/vinyl acetate/vinyl alcohol copolymers, vinyl chloride/vinyl acetate/maleic anhydride copolymers, and vinyl chloride/vinyl acetate/acrylic acid copolymers. Most preferred are vinyl chloride/vinyl acetate/maleic anhydride copolymers, It is necessary to include in the magnetic recording layer of the recording medium of the invention an abrasive having a Mohs' scale of hardness of not less than 6. Examples of the abrasive include α-Fe₂O₃, SiC, α-Al₂O₃ and Cr₂O₃.

The average particle size of the abrasive preferably is in the range of 0.01 to 5 μm. More preferably, the average particle size is in the range of 0.1 to 1 μm.

The abrasive is incorporated into the magnetic recording layer in an amount of generally 0.1 to 20 parts by weight, preferably 1 to 10 parts by weight, based on 100 parts by weight of the ferromagnetic metal powder.

A magnetic recording medium of the invention can contain in the recording layer one or more other additives. One example of the other additives is carbon black having a mean diameter of 0.01 to 0.3 μm.

The magnetic recording medium of the present invention can be produced by a process comprising the steps of first by preparing a magnetic paint (or dispersion) containing the ferromagnetic metal powder, binder, abrasive, and optional additives such as dispersing agent, lubricant, stabilizer and antistatic agent in an organic solvent such as methyl ethyl ketone, or cyclohexane, then applying this magnetic paint onto a nonmagnetic support, upon which the magnetic paint is processed to dryness. Generally, a magnetic recording layer is formed by applying the magnetic paint directly on a nonmagnetic support, but it is also possible to provide an adhesive layer or a subbing layer between the magnetic paint layer and the nonmagnetic support.

The dispersing agent employable is, for example, a fatty acid having 12 to 22 carbon atoms (e.g., caprylic acid, capric acid, lauric acid, myristic acid, palmitic acid, stearic acid, oleic acid, elaidic acid, linoleic acid,, linolenic acid; a soap of an alkali metal (e.g., lithium, sodium or potassium) or an alkaline earth metal (e.g., magnesium, calcium or barium) of the above-stated fatty acid; a fatty acid amide derived from the fatty acid, an aliphatic amine, a higher alcohol, a polyalkyleneoxide alkylphosphate ester, an alkylphosphate ester, an alkylborate ester, a sarcosinate, an alkyl ether esters, or other known disperser or surfactant such as a trialkylpolyolefin quaternary ammonium salt and lecithin.

The lubricant is, for example, a fatty acid, a higher alcohol, a fatty acid ester of a monovalent fatty acid having 12 to 20 carbon atoms and a mono/polyhydric alcohol having 3 to 20 carbon atoms (e.g., butyl stearate or sorbitan oleate); a mineral oil, an animal or vegetable oil, an olefin polymer having a low molecular weight, an α-olefin polymer having low molecular weight, or other known lubricant, for instance, for plastics (e.g., graphite powder, molybdenum disulfide powder or teflon powder).

The antistatic agent is, for example, a natural surfactant (e.g., saponin), a nonionic surfactant (e.g., of alkylenoxide type, of glycerol type, or of glycidol type), a cationic surfactant (e.g., higher alkylamine, quarternary ammonium salt, heterocyclic phosphonium compound such as pyridine or sulfonium compounds), an anionic surfactant (e.g., carboxylic acid, sulfonic acid, phosphate or compound having acid groups such as sulfuric ester-type or phosphoric ester type), and an amphoteric surfactant (e.g., amino acid, amino sulfonic acid, sulfuric or phosphoric ester of amino alcohol).

The procedure for preparing a magnetic paint as well as the procedure for coating the magnetic paint as such are well known. Also known are other treating processes such as a drying process, a magnetic orienting process, a smoothing process using a calender roll, and a slitting process. Accordingly, there is no need to further give a detailed description thereon.

The magnetic recording layer preferably has a thickness (after dryness) generally of approx. 0.5 to 10 μm, preferably of approx. 1.5 to 7.0 μm.

The magnetic recording medium of the invention is particularly advantageous in the case that it is applied to a video tape. A video tape according to the invention shows remarkably high video output. Moreover, this video tape shows an improved running property, and hence it shows a relatively long still life.

Moreover, a magnetic paint (i.e., dispersion) is very stable even in a relatively long-term storage. Therefore, magnetic recording media of well controlled quality can be easily produced even when the storage period of the magnetic paint varies or is prolonged.

The examples and the comparison examples of the present invention are given below. In the following examples, the expression "parts" means "parts by weight", otherwise specified.

EXAMPLE 1

The components indicated below were kneaded in a ball mill for 48 hrs. to give a dispersion.

Ferromagnetic metal alloy powder (Fe—Zn—Ni alloy,
  Fe: 94 wt. %, Zn: 4 wt. %, Ni: 2 wt. %,
  Hc: 1,500 Oe, specific surface area(S-BET): 40 $m^2/g$): 100 parts
Vinyl chloride/vinyl acetate/maleic anhydride copolymer (copolymerization ratio=86:13:1, degree of polymerization: 400): 8 parts
Polycarbonate-polyurethane resin: 8 parts
α-Alumina (mean particle size: 500 mμ, Mohs' scale of hardness: 9): 3 parts
Carbon black (mean particle size: 94 mμ): 2 parts
Stearic acid: 2 parts
Butyl stearate: 2 parts
Methyl ethyl ketone: 300 parts The above-mentioned polycarbonate-polyurethane was prepared by the following process.

200 parts of 1,6-hexanediol and 100 parts of diethylpolycarbonate were melted at 150° C. with removal of produced ethyl alcohol to perform transesterification. Thus, polycarbonate-polyol was obtained. 100 parts of thus obtained polycarbonate-polyol was caused to react with 6 parts of 1,6-hexanediol, 6 parts of isophoronediamine and 100 parts of 4,4-diphenylmethane diisocyanate(hydrogenation catalyst) to obtain polycarbonate-polyurethane. The obtained polycarbonate-polyurethane had a weight average molecular weight of 40,000.

To the dispersion was added 5 parts of polyisocyanate, and the mixture was further kneaded for one hour. The resulting dispersion was filtered over a filter having a mean pore size of 1 μm to give a magnetic paint.

The magnetic paint was coated over a polyethylene terephthalate support (thickness: 10 μm, center line average height at a cut-off value of 0.25 mm: 0.008 μm) to give a coated layer of a thickness 4.0 μm (thickness in dry state) by means of a reverse roll. The support with the coated layer was treated with an electromagnet at 3,000 gauss under wet condition to give a magnetic orientation. After the coated layer was dried, the layer was subjected to supercalendering. The resulting sheet was slitted to give video tapes (VHS type) having a width of ½ inch.

The obtained video tape was examined with respect to regeneration output, still life, tendency to cause clogging on a magnetic head, and a glossiness of the surface thereof.

A signal of 4 MHz was input into the resulting video tape in a video recorder (NV-6600 type available from Matsushita Electric Industrial Co., Ltd.), and then the singal was regenerated from the video tape. It was observed that the tested video tape gave a video output of 9.2 dB which was a relative value with reference to a reference tape (VHS type video tape available from Fuji Photo Film Co., Ltd.) in which a video output of the reference tape recorded with a signal of the same 4 MHz was set to O dB.

Still life of the video tape was examined by running the tape in contact with a magnetic head in the above-mentioned video recorder under a still mode. The examination was made to determine the term (i.e., still life) at the end of which the regenerated video image under still mode turns to an extremely deteriorated one. The tested video tape had a still life of longer than 120 min., which was satisfactory in a practical use.

A signal was recorded on the video tape for 120 min. and then recorded signal was regenerated in the above-mentioned video recorder. In the course of the regeneration process, change of the regeneration output was observed to check occurrence of clogging on a magnetic head in contact with the tape. The regeneration output never decreased even after the tape was run for 120 min. Further it was confirmed that no clogging took place on the magnetic head.

The glossiness of the surface of the mangetic recording layer was measured twice, that is, immediately after the video tape was prepared, and at 10 hours after the preparation. The measurement of the glossiness was done by measuring total reflection light (at an angle of 45°) produced when a light was impinged upon the surface at an angle of 45° using a standard glossmeter (Digital Glossmeter GK 45D Type available from Suga Testing Machine Co., Ltd.). Thus, the change of glossiness on the surface of the magnetic recording layer was checked for evaluating stability of the smooth surface of the recording layer. It was confirmed that lowering of the glossiness of the video tape was 5.

EXAMPLE 2

The procedure of Example 1 was repeated except that the following ferromagnetic metal alloy powder was used.
  Fe—Zn—Ni alloy, Fe: 94 wt. %, Zn: 4 wt. %, Ni: 2 wt. %, S—BET: 50 $m^2/g$.

The resulting video tape was examined in the same manner as described in Example 1. The results are as follows:
  Relative video output: 9.6 dB
  Still life: longer than 120 min.
  Change of regeneration output: no lowering was observed, and no clogging was observed on the magnetic head.
  Lowering of Glossiness on the surface of magnetic recording layer: 5

EXAMPLE 3

The procedure of Example 1 was repeated except that the following ferromagnetic metal allow powder was used.

Fe—Zn—Ni alloy, Fe: 94 wt. %, Zn: 4 wt. %, Ni: 2 wt. %, S—BET: 60 m²/g.

The resulting video tape was examined in the same manner as described in Example 1. The results are as follows:
- Relative video output: 9.7 dB
- Still life: longer than 120 min.
- Change of regeneration output: no lowering was observed, and no clogging was observed on the magnetic head.
- Lowering of Glossiness on the surface of magnetic recording layer: 7

EXAMPLE 4

The procedure of Example 1 was repeated except that the following polycarbonate-polyurethane was employed.

100 parts of bisphenol A, 100 parts of 1,6-hexanediol and 100 parts of diethylpolycarbonate were melted at 150° C. with removal of produced ethyl alcohol to perform transesterification. Thus, polycarbonate-polyol was obtained. 100 parts of thus obtained polycarbonate-polyol was caused to react with 200 parts of 1,10-decanedicarboxylic acid at 200° C. to prepare a polycarbonate-polyester-polyol. 100 parts of thus prepared polycarbonate-polyester-polyol was then caused to react with 10 parts of 1,6-hexanediol, 10 parts of isophoronediamine and 100 parts of 4,4-diphenylmethane diisocyanate(hydrogenation catalyst) to obtain polycarbonate-polyurethane. The obtained polycarbonatepolyurethane had a weight average molecular weight of 30,000.

The resulting video tape was examined in the same manner as described in Example 1. The results are as follows:
- Relative video output: 12.8 dB
- Still life: 240 min.
- Change of regeneration output: lowering was observed, and clogging was noted on the magnetic head.
- Lowering of Glossiness on the surface of magnetic recording layer: 1

COMPARISON EXAMPLE 1

The procedure of Example 1 was repeated except that the polycarbonate-polyurethane was replaced with polyester-polyurethane prepared from adipic acid, hexamethylene glycol, and tolylene diisocyanate.

The resulting video tape was examined in the same manner as described in Example 1. The results are as follows:
- Relative video output: 8.0 dB
- Still life: 80 min.
- Change of regeneration output: lowering was observed, and clogged was noted on the magnetic head.
- Lowering of Glossiness on the surface of magnetic recording layer: 10

COMPARISON EXAMPLE 2

The procedure of Comparison Example 1 was repeated except that the following ferromagnetic metal alloy powder was used.

Fe—Zn—Ni alloy, Fe: 94 wt. %, Zn: 4 wt. %, Ni: 2 wt. %, S—BET: 50 m²/g.

The resulting video tape was examined in the same manner as described in Example 1. The results are as follows:
- Relative video output: 8.1 dB
- Still life: 60 min.
- Change of regeneration output: lowering was observed, and clogging was noted on the magnetic head.
- Lowering of Glossiness on the surface of magnetic recording layer: 16

COMPARISON EXAMPLE 3

The procedure of Comparison Example 1 was repeated except that the following ferromagnetic metal allow powder was used.

Fe—Zn—Ni alloy, Fe: 94 wt. %, Zn: 4 wt. %, Ni: 2 wt. %, S—BET: 60 m²/g.

The resulting video tape was examined in the same manner as described in Example 1. The results are as follows:
- Relative video output: 8.1 dB
- Still life: 40 min.
- Change of regeneration output: lowering was observed, and clogging was noted on the magnetic head.
- Lowering of Glossiness on the surface of magnetic recording layer: 20

COMPARISON EXAMPLE 4

The procedure of Example 1 was repeated except that the following ferromagnetic metal alloy powder was used.

Fe—Zn—Ni alloy, Fe: 94 wt. %, Zn: 4 wt. %, Ni: 2 wt. %, S—BET: 30 m²/g.

The resulting video tape was examined in the same manner as described in Example 1. The results are as follows:
- Relative video output: 8.2 dB
- Still life: longer than 120 min.
- Change of regeneration output: no lowering was observed, and no clogging was observed on the magnetic head.
- Lowering of Glossiness on the surface of magnetic recording layer: 5

COMPARISON EXAMPLE 5

The procedure of Example 2 was repeated except that no α-alumina was used.

The resulting video tape was examined in the same manner as described in Example 1. The results are as follows:
- Relative video output: 9.6 dB
- Still life: 100 min.
- Change of regeneration output: lowering was observed, and clogging was noted on the magnetic head.
- Lowering of Glossiness on the surface of magnetic recording layer: 5

The results given in the above-described Examples and Comparison Examples indicate a magnetic recording medium in the form of a video tape having a magnetic recording layer which comprises a ferromagnetic metal powder having a specific surface area of not less than 40 m²/g and an abrasive having a Mohs' scale of hardness of not less than 6, both being dispersed in a binder containing a polycarbonate-polyurethane shows a longer still life, enhanced video output, no decrease of video output caused by clogging on the magnetic head after a long term running, and relatively low decrease of surface smoothness of the recording layer.

In contrast, video tapes using a conventional binder composition (Comparison Examples 1–3) are not advantageous in the still life, video output, change of the video output and clogging after long term running, and easy change of surface smoothness of the recording layer.

A video tape using a ferromagnetic metal powder having a smaller specific surface area (Comparison Example 4) gives insufficient video output. A video tape using no abrasive (Comparison Example 5) shows a shorter still life, and the magnetic head in contact with the tape easily suffers from clogging.

We claim:

1. A magnetic recording medium comprising a nonmagnetic support and a magnetic recording layer provided on said support, in which said magnetic recording layer comprises:
    a ferromagnetic metal alloy powder having a specific surface are of not less than 40 m$^2$/g and
    an abrasive having a Mohs' scale of hardness of not less than 6,
    both being dispersed in a binder containing a polycarbonate-polyurethane having a weight average molecular weight of 5,000 to 200,000.

2. The magnetic recording medium as claimed in claim 1, wherein said binder contains said polycarbonate-polyurethane in an amount of at least 10 % by weight based on the total weight of the binder.

3. The magnetic recording medium as claimed in claim 1, wherein said binder further contains a vinyl chloride/vinyl acetate/maleic anhydride copolymer.

4. The magnetic recording medium as claimed in claim 1, wherein said abrasive is selected from the group consisting of α-Fe$_2$O$_3$, SiC, α-Al$_2$O$_3$ and Cr$_2$O$_3$.

5. The magnetic recording medium as claimed in claim 4, wherein said abrasive is contained in said magnetic recording layer in an amount ranging from 0.1 to 20 parts by weight based on 100 parts by weight of the ferromagnetic metal alloy powder.

6. The magnetic recording medium as claimed in any claim of claims 1 to 4, wherein said nonmagnetic support has a center line average height of lower than 0.1 μm at a cut-off value of 0.25 mm.

7. The magnetic recording medium as claimed in any claim of claims 1 to 4, wherein said nonmagnetic support has a center line average height of lower than 0.02 μm at a cut-off value of 0.25 mm.

8. The magnetic recording medium as claimed in claim 1, wherein said polycarbonate-polyurethane has a repeating unit derived from an aromatic polyhydric alcohol.

9. The magnetic recording medium as claimed in claim 8, wherein said aromatic polyhydric alcohol is bisphenol A.

10. The magnetic recording medium as claimed in claim 2, wherein said ferromagnetic metal alloy powder is an Fe—Zn—Ni alloy powder, said abrasive is contained in said magnetic recording layer in an amount ranging from 0.1 to 20 parts by weight based on 100 parts by weight of the said ferromagnetic metal alloy powder and wherein said nonmagnetic support has a ceter line average height of lower than 0.1 um at a cut-off value of 0.25 mm.

11. The magnetic recording medium as claimed in claim 10 wherein said binder contains said polycarbonate-polyurethane in an amount of at least 30% by weight based on the total weight of the binder and wherein said abrasive is selected from the group consisting of α-Fe$_2$O$_3$, SiC, α-Al$_2$O$_3$ and Cr$_2$O$_3$.

12. A magnetic recording medium comprising a nonmagnetic support and a magnetic recording layer provided on said support, in which said magnetic recording layer comprises:
    a magnetic powder consisting of a ferromagnetic metal alloy powder of not less than 40 m$^2$/g and
    an abrasive having a Mohs' scale of hardness of not less than 6,
    both being dispersed in a binder containing a polycarbonate-polyurethane having a weight average molecular weight of 5,000 to 200,000.

* * * * *